(12) United States Patent
Reichmann et al.

(10) Patent No.: US 11,256,855 B2
(45) Date of Patent: Feb. 22, 2022

(54) SYSTEMS AND METHODS FOR COLLATION OF DIGITAL CONTENT

(71) Applicant: Zave IP, LLC, Monsey, NY (US)

(72) Inventors: Andre Reichmann, Monsey, NY (US); Meir Simcha Bulua, Southfield, MI (US); Inessa Barkan, Barrie (CA)

(73) Assignee: Zave IP, LLC, Monsey, NY (US)

( * ) Notice: Subject to any disclaimer, the term of this patent is extended or adjusted under 35 U.S.C. 154(b) by 0 days.

(21) Appl. No.: 16/536,546

(22) Filed: Aug. 9, 2019

(65) Prior Publication Data
US 2021/0042385 A1 Feb. 11, 2021

(51) Int. Cl.
*G06F 17/00* (2019.01)
*G06F 40/166* (2020.01)
*G06T 11/00* (2006.01)
*G06F 16/908* (2019.01)
*G06F 40/103* (2020.01)

(52) U.S. Cl.
CPC .......... *G06F 40/166* (2020.01); *G06F 16/908* (2019.01); *G06F 40/103* (2020.01); *G06T 11/001* (2013.01)

(58) Field of Classification Search
None
See application file for complete search history.

(56) References Cited

U.S. PATENT DOCUMENTS

| | | | |
|---|---|---|---|
| 8,495,514 B1* | 7/2013 | Ludolph | G06F 3/0481 715/768 |
| 9,244,890 B2 | 1/2016 | Abe | |
| 2002/0044152 A1* | 4/2002 | Abbott | G06T 19/006 345/629 |
| 2006/0143563 A1* | 6/2006 | Sauermann | G06F 40/186 715/273 |
| 2006/0274057 A1* | 12/2006 | Van Ness | G06F 3/04883 345/179 |
| 2007/0233692 A1* | 10/2007 | Lisa | G06F 16/9535 |
| 2008/0016164 A1* | 1/2008 | Chandra | H04N 1/32144 709/206 |
| 2008/0046845 A1* | 2/2008 | Chandra | G06F 16/9577 715/856 |
| 2009/0271806 A1* | 10/2009 | McDonald | G06F 40/106 719/329 |
| 2013/0318429 A1* | 11/2013 | Dantas | G06F 9/451 715/234 |

(Continued)

OTHER PUBLICATIONS

TechSmith Corp., "SnagIt online Help Guide", NPL, total pp. 285, date retrieved: May 23, 2012 (Year: 2012).*

(Continued)

*Primary Examiner* — Mustafa A Amin
(74) *Attorney, Agent, or Firm* — Weiss & Arons LLP

(57) ABSTRACT

Systems and methods for collating digital content are provided. A widget that remains visible may be displayed on a screen of a computing device. The computing device may be running multiple applications that are displaying digital content. A cursor on the screen may be configured to select, highlight, copy, and/or paste digital content. The pasting may be to an organized location in a target destination. The target destination, and/or the organized location, may be based at least in part on a color selected via the widget.

19 Claims, 12 Drawing Sheets

(56) References Cited

U.S. PATENT DOCUMENTS

| | | | | |
|---|---|---|---|---|
| 2014/0143681 A1* | 5/2014 | Chandra | ................ | H04L 51/08 |
| | | | | 715/752 |
| 2015/0058716 A1* | 2/2015 | Boothman | .............. | G06F 40/14 |
| | | | | 715/254 |
| 2015/0227509 A1* | 8/2015 | Landau | .................. | G06F 40/58 |
| | | | | 704/2 |
| 2016/0292441 A1* | 10/2016 | Stuntebeck | ......... | G06F 21/6218 |
| 2017/0285914 A1* | 10/2017 | Ellbogen | ............. | G06F 3/04842 |
| 2019/0266204 A1* | 8/2019 | Chandra | ............ | G06Q 30/0271 |

OTHER PUBLICATIONS

SNAGIT Screenshots, NPL, pp. 1-4, release date of software Jun. 15, 2006 (Year: 2006).*

* cited by examiner

Code detects that Zave window ( widget or not widget ) NOT Active .

```
//Event Handler for deactive window
 private void Window_Deactivated(object sender, EventArgs args)
 {
    var window = (Window)sender;
    try
    {
       if (((MainWindowViewModel)((MainWindow)sender).DataContext).WinMode == WindowMode.WIDGET)
       {
          window.Topmost = true;
          window.Opacity = 0.5;
          window.BeginAnimation(Window.OpacityProperty, null);
          window.Activate();
       }
       else
       {
         // create widget form
          window.Topmost = false;
          (DataContext as MainWindowViewModel).GotoWidget();

}
    }
    catch (NullReferenceException nre)
    {

```
//going to widget private void WindowModeChange<ViewType, ViewModelType>(string uri)
        where ViewType : UserControl
        where ViewModelType : BindableBase
    {
        var mviewRegion = regionManager.Regions[RegionNames.MainViewRegion];

if (mviewRegion == null) return;

var uc = container.Resolve<MainWindow>(InstanceNames.MainWindowView);
        uc.Dispatcher.Invoke(() =>
        mviewRegion.RequestNavigate(new Uri(uri, UriKind.Relative), (x =>
        {
            uc.Dispatcher.Invoke(() =>
ShiftWindowOntoScreenHelper.ShiftWindowOntoScreen(uc),
                DispatcherPriority.Loaded);

if (x.Result == true)
            {
                if (uri.Equals(InstanceNames.WidgetView) &&
((MainWindowViewModel)uc.DataContext).SnapToCorner)
                {
                    ShiftWindowOntoScreenHelper.ShiftWindowOntoDesiredCorner(uc,
DesiredCorner.BOTTOM_RIGHT);
                }
                eventAggregator.GetEvent<WindowModeChangedEvent>().Publish(true);
            }
        }))
        );

//real shift of window

```csharp
public static class ShiftWindowOntoScreenHelper
{
    private static readonly ILog Log =
LogManager.GetLogger(MethodBase.GetCurrentMethod().DeclaringType);
    private static Rectangle windowRect;
    /// <summary>
    ///    Intent:
    ///    - Shift the window onto the visible screen.
    ///    - Shift the window away from overlapping the task bar.
    /// </summary>
    public static void ShiftWindowOntoScreen(Window window)
    {
        var taskBarLocation = GetTaskBarLocationPerScreen();
        // Note that "window.BringIntoView()" does not work.
        if (window.Top < SystemParameters.VirtualScreenTop)
        {
            window.Top = SystemParameters.VirtualScreenTop;
        } if (window.Left < SystemParameters.VirtualScreenLeft)
        {
            window.Left = SystemParameters.VirtualScreenLeft;
        } if (window.Left + window.Width > SystemParameters.VirtualScreenLeft + SystemParameters.VirtualScreenWidth)
        {
            window.Left = SystemParameters.VirtualScreenWidth + SystemParameters.VirtualScreenLeft - window.Width;
        }
```

FIG. 10C

```
    if (window.Top + window.Height > SystemParameters.VirtualScreenTop +
SystemParameters.VirtualScreenHeight)
        {
            window.Top = SystemParameters.VirtualScreenHeight +
SystemParameters.VirtualScreenTop - window.Height - taskBarLocation[0].Height;
        }

// Shift window away from taskbar.
        {

// If taskbar is set to "auto-hide", then this list will be empty, and we will do
nothing.
            foreach (var taskBar in taskBarLocation)
            {
                windowRect = new Rectangle((int) window.Left, (int) window.Top, (int)
window.Width,
                    (int) window.Height);

// Keep on shifting the window out of the way.
                var avoidInfiniteLoopCounter = 25;
                while (windowRect.IntersectsWith(taskBar))
                {
                    avoidInfiniteLoopCounter--;
                    if (avoidInfiniteLoopCounter == 0)
                    {
                        break;
                    }

// Our window is covering the task bar. Shift it away.
                    var intersection = Rectangle.Intersect(taskBar, windowRect);

if (intersection.Width < window.Width
                        // This next one is a rare corner case. Handles situation where
taskbar is big enough to
                        // completely contain the status window.
                        || taskBar.Contains(windowRect))
                    {
```

FIG. 10D

```
            if (taskBar.Left == 0)
            {
               // Task bar is on the left. Push away to the right.
               window.Left = window.Left + intersection.Width;
            }
            else
            {
               // Task bar is on the right. Push away to the left.
               window.Left = window.Left - intersection.Width;
            }
         } if (intersection.Height < window.Height
            // This next one is a rare corner case. Handles situation where taskbar is big enough to
            // completely contain the status window.
            || taskBar.Contains(windowRect))
         {
            if (taskBar.Top == 0)
            {
               // Task bar is on the top. Push down.
               window.Top = window.Top + intersection.Height;
            }
            else
            {
               // Task bar is on the bottom. Push up.
               window.Top = window.Top - intersection.Height;
            }
         } windowRect = new Rectangle((int) window.Left, (int) window.Top, (int) window.Width,
            (int) window.Height);
\
      }
    }
  }
```

FIG. 10E

SYSTEMS AND METHODS FOR COLLATION OF DIGITAL CONTENT

FIELD OF TECHNOLOGY

Aspects of the disclosure relate to systems and methods for collating digital content.

BACKGROUND OF THE DISCLOSURE

Digital content in the modern world is a mainstay of nearly every field of study and practice, as well as every-day tasks and activities. Students of virtually every subject, and practitioners of many fields, must study, review, and research countless texts and documents. Today, many of those texts and documents are viewed in digital form. A large portion of the population also spends a substantial part of their days consuming digital content in the form of entertainment, news, social media, and other forms of digital content.

A consumer of digital content often has a need to mark and/or save portions of the digital content for later reference. For example, a lawyer or student of the law who is researching a certain topic may need to mark, annotate, and/or save relevant portions of one or more research sources. Furthermore, the consumer may be researching multiple topics or sub-topics, and may wish to organize the saved content topically. Sources of content may be accessed by a consumer via any suitable communication and digital tool.

It would be desirable, therefore, to provide systems and methods for collating, annotating, and organizing digital content.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which:

FIGS. 10A-10E show illustrative computer code in accordance with principles of the disclosure.

DETAILED DESCRIPTION OF THE DISCLOSURE

Figure 1:
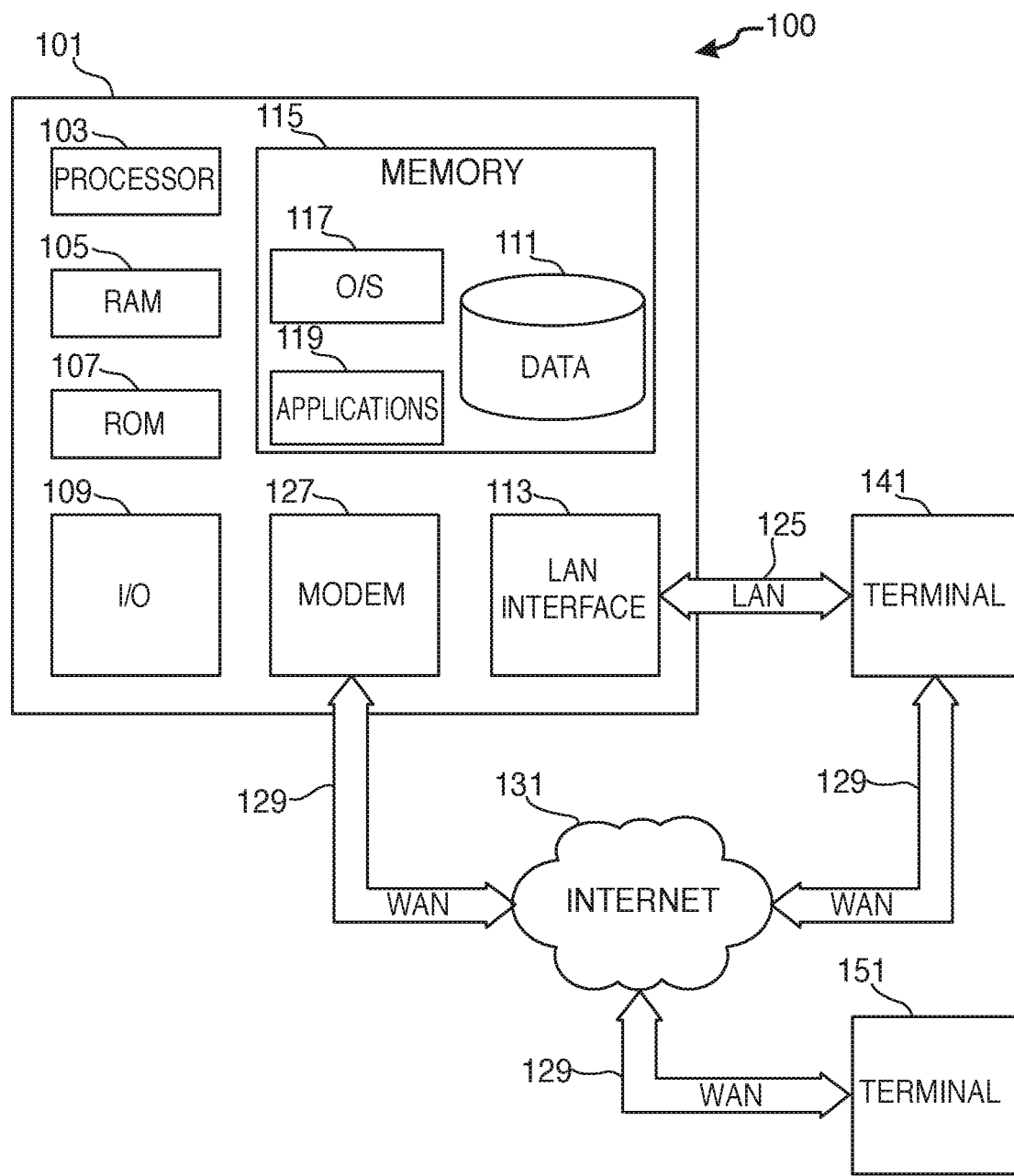
FIG. 1 shows an illustrative system in accordance with principles of the disclosure.

Systems and methods for collating digital content are provided. The systems and methods may include computer executable instructions that, when run on a processor, are configured to execute method steps and/or provide collating functionality.

A system according to aspects of the disclosure may continuously display a widget on a screen of a computing device. A widget may be a software application. A widget may be run on a computer system. A widget may be a user interface for accessing the complete or partial features of a software application. The user interface may provide faster access to specific features of the software application. A widget may be run on a computer system concurrently with other programs. The other programs may include other applications and an operating system. The operating system may provide user access to the other programs via application windows or other framed areas presented on a screen for viewing information associated with the application. A widget may provide access to its operational features while allowing other applications to run on the computing device. A widget may also be displayed via an application window. A widget may, in some instances, be displayed on only a part of the screen.

Typically, an application window needs to be active for the application to receive user input. For example, using the windows operating system, clicking or maximizing an application window may activate the application window and allow a user to enter input. Furthermore, when user focus shifts to an application, all other applications and associated application windows are typically pushed to the background and only one application window remains active. A user may also send an application to the background by minimizing an application window associated with the application. An active application or application window may receive user input. Applications running in the background are generally inactive in the sense that they are unable to receive user input. Typically, it is not possible to have two active applications that both share a user focus and may each receive user input concurrently.

Continuously displaying the widget may, in some embodiments, include keeping the widget visible on the screen. The widget may be kept visible on the screen despite minimizing, maximizing or changing a focus to activate another application window running on the computing device. The widget may remain visible in a foreground of the screen despite a shift in user focus to another application window. Keeping the widget visible in a foreground of the screen may, in some embodiments, include preventing an operating system from pushing the widget to the background when user focus shifts to another application.

The widget may be configured to operate as if user focus has not shifted away from the widget, despite user actions (e.g., a mouse click in another application window) that would typically shift user focus away from the widget. For example, the widget may remain superimposed over any other application windows displayed on the screen despite minimizing, maximizing or any other user action that would typically shift user focus to another application window. The widget may continue to control a shape of a cursor displayed in another application window, despite a shift in user focus to the other application window. The widget may continue to select and highlight text displayed in another application window, or provide any other widget functionality described herein to text displayed in another application window, despite user focus shifting to the other application window.

The widget may be in a semi-active state, remaining continuously visible, operational, and/or available to receive user input (e.g., via a cursor controlled by the widget) even when another application window is active. Configuring the widget to remain in a semi-active state presents a technical challenge, since typically, standardized computer operating systems only allow for one application window to be active at time and all other application windows are inactive. Inactive and/or minimized application windows, and all application windows aside from the one active application window, are typically unavailable to receive input or user instructions.

In some embodiments of the system, the widget may be configured with a fading feature. The fading feature may adjust a visual attribute of the widget while the widget is kept visible on the screen. For example, the fading feature may adjust a color or translucence of the widget when another application window is active on the screen. The fading feature may change (increase or decrease) brightness of the widget and/or change (increase or decrease) translucence of the widget. The fading feature may change any other visible characteristic of the widget.

The widget may include a color selector. The color selector may display a selected color. The color selector may include multiple color options available for user selection. In some embodiments, the color selector may include a graphical color palette (e.g., a graphical display of various colors overlapping and/or merging into each other) that allows a system user to select from a continuum of colors and/or shades.

The system may augment a cursor displayed on the screen. The augmented cursor may indicate that the widget is ready to collate content displayed on the screen. In some embodiments, the augmented cursor may be displayed on the screen in a shape that is different than a default shape of the cursor. For example, a cursor that has a default arrow or I-beam shape may display as a highlighter pen when the widget is running or active. In another example, the augmented cursor may display an array of colorful lines, which may vary in length, to show that the widget is active and ready to collate digital content. The augmented cursor may also take on any other suitable shape that may or may not be a default shape of the cursor.

Selecting digital content displayed on the screen via the augmented cursor may mark the displayed content using a mark defined by the widget. In a preferred embodiment, a mark may include highlighting the selected content. A mark may also, or alternatively, include underlining the selected content, changing the color of the selected content, displaying a line or other symbol near the selected content (e.g., along a margin), changing the font of the selected content from regular to bold, italics, or a font that is not the original content font, and/or any other suitable mark. In some embodiments, the mark may not be displayed on the screen, and may serve as a software tag, useful for searching for and/or accessing the selected content.

Marking content may include highlighting content. Selecting digital content displayed on the screen (e.g., via the augmented cursor) may highlight the displayed content using a color selected using the color selector. The system may be configured to apply highlighting by issuing instructions to an application that is displaying the content on the screen. The system may also be configured to save the highlighting applied to the selected content. The system may save the highlighting to a destination file that collates selected content. The system may save the highlighting to the source file that is being accessed to display the content on the screen.

Saving the highlight in the source file may cause the selected text to be displayed with the highlight when the source file is accessed by a different application and/or when the source file is reopened at a later time. Applying and/or saving the highlight may include applying the highlighting to a temporary version of the source file, and a process for saving the applied highlight may depend on the application running the source file. The applied highlighting may be saved using functionality provided by the application displaying the content. For example, the system may be configured to save the highlighting by issuing instructions to the application that is displaying the content on the screen.

Selecting content on the screen may also copy the highlighted content, and paste the highlighted content into a target destination. The target destination may be an electronic file. In some embodiments, the target destination may be one of multiple target destinations. The system may be further configured to determine a target destination of the content based on the color used to highlight the content.

In some embodiments, two or more of the target destinations may be different sections of a single destination. For example, a destination may be an electronic file. The file may be divided into different sections. Each section may correspond to a different color. Depending on the color used to highlight content, the system may automatically paste highlighted content to a corresponding section of the file. In one illustrative example, content selected when blue is displayed on the color selector of the widget may be copied and automatically pasted to one section of the file, content selected when red is displayed on the color selector of the widget may be copied and automatically pasted into a second section of the file, etc.

In certain embodiments, a file with a unique extension may be created as a destination for collating selected content. For example, the file may be defined by a "ZDF" extension. The unique extension may convey that the file includes a structure that collates contents of the file. In some embodiments, at least one of the target destinations may be a social media platform, or any other suitable destination for pasting selected content. The system may be configured to push content to a specific social media platform based on a color applied to mark digital content.

The file (or other suitable destination) may be created and/or opened automatically, e.g., when the widget is initiated or when content is first marked. The widget may autonomously control access to the file. The file may, in some embodiments, be created/opened manually by a user. In certain embodiments, one or more files, or other primary destination(s), may be default destinations, and the system may allow a user to change the default destination and create/open additional files and/or other destinations.

In some embodiments, the system may be configured to capture metadata associated with marked content. The system may be further configured to tag, or label, the marked content in the target destination with the metadata. Tagging the marked content with the metadata may include storing the metadata along with the content in the target destination. Tagging the marked content with the metadata may include displaying the metadata when the target destination is accessed. Displaying the metadata along with the content may include displaying the metadata next to the content (e.g., in parenthesis or other suitable notation alongside or after the content); as a footnote, endnote, or appendix of the target destination; or any other suitable location of the target destination.

Some embodiments may be configured to allow a user to add comments to be associated with the content in the target destination. In some embodiments, the system may allow the user to share the comments associated with the marked content. Sharing the metadata and/or the comments may enable a peer to view and/or jointly change the metadata and/or the comments and add new comments. The sharing feature may include varying levels of permissions, wherein some peers may have "view only" permission, others may be able to add their own input (which may be labeled by author), and still others may be able to edit data and/or comments that are not their own.

In some embodiments, information used to tag content may not be immediately visible in the target destination, and may be accessible by taking an action, such as clicking a link or hovering the cursor over the pasted content in the target destination. Information included in a tag may include information that may be used to retrieve the content from its source location or search for the content (e.g., on the internet or within a database).

In some embodiments, a format of metadata used to tag marked content may be customizable. For example, the format may be selected to be a formal citation format. Exemplary citation formats may include APA (American Psychological Association) format, MLA (Modern Language Association) format or formats listed in The Chicago Manual of Style published by the University of Chicago Press. In some embodiments, the format may be customizable as to which of the available metadata information should be included, as well as how the information should be displayed/formatted.

Metadata captured by the system may include a descriptor. The descriptor may describe the type of application displaying the marked content. The descriptor may, in some embodiments, be chosen from a predetermined set of source categories. The metadata may include a timestamp, e.g., a time at which the content was marked. The metadata may also include a page number, line number, date or timestamp (i.e., of content creation or publication), title, author, email sender, and/or any other suitable information associated with the marked content.

In certain embodiments, the system may be configured with one or more mode options, and may enable switching between various modes. For example, the system may present a mode selector that allows a user to toggle the widget between an inactive mode and an active mode. The cursor may only be augmented to select, highlight, copy, and/or paste content when the widget is in an active mode. Deactivating the widget may suspend one or more of the aforementioned features while keeping the widget visible on the screen. The default setting for the widget may be the active mode. When the widget is inactive, a visual display characteristic (e.g., translucence) may be altered compared to the visual display characteristic of the widget in the active mode.

In some embodiments, the system may be configured to disable the copying and the pasting of the marked content. Disabling the copying and the pasting of the highlighted content may be triggered by selection of an option to disable copy/paste while retaining the highlighting or other system functionality. In some embodiments, an option may be presented to disable the highlighting feature while retaining copy/past functionality. The options may be presented on the widget. A copy/paste feature may be disabled in response to detecting that a threshold quantity of content has been marked. The threshold quantity may be determined based on a percentage of the marked content compared to a total size of the work that includes the marked content. The threshold quantity may be determined based on criteria for fair use of copyrighted content.

In some embodiments, the system may be operable across two or more applications running on the computing device. Exemplary applications may include: a word processor application; a Portable Document Format ("PDF") application; a web browser; an email application; and/or any other suitable applications.

For example, a word processor, a PDF viewer, a web browser, and an email application may be running on the computing device. Each application may display digital content on a screen of the computing device. The system may enable a user, e.g., a researcher who is researching one or more topics, to mark content displayed by the word processor, PDF viewer, web browser, and/or email application. Marked content may be copied and pasted automatically (e.g., by the system and without further input from the researcher) to a destination file. Furthermore, the researcher may adjust the color used to mark content before marking content relating to different topics. Content marked in different colors may be automatically collated by the system when pasted into a destination file. The system may collate the marked content based on color used to mark content of interest.

Applications run on the computer system may display different types of content. For example, the applications may present text, photos, video, audio, or any other suitable digital content. Such content may be displayed by an operating system of the computer system in an application window. The system may be further configured to support selecting, highlighting, copy/pasting, and otherwise collating content across various types of digital content.

In some embodiments, the system may be configured to mark content using a white-out color. The white-out color may be included in a color palette and available for selection by a user. When the white-out color is selected and activated by the user, the system may mark content by masking selected content. Masking content may redact or otherwise render the content invisible (with respect to other displayed content). Masking content may allow new content to be inserted in a location of the masked content—e.g., writing over the masked content. The system may allow an unmasking of the masked content.

In some embodiments, the system may be operable with an input tool. The input tool may be coupled to the computing device. The input tool may include a custom input tool designed specifically to operate and implement functionality of the system. The input tool may include a sensor for sensing movement input by a user. The user movement may control a movement of the cursor on a screen. The input tool may also include a plurality of buttons. Each of the plurality of buttons, when pressed by a user, may be configured to activate a different color via the color selector. The input tool may also include any other suitable mechanisms for operating any disclosed functionality of the system.

A method for organized, color-coded collating of digital content is provided. The method may be executed by computer executable instructions running on a processor. The method may include displaying a widget on a screen of a computing device. The widget may include a color selector.

The method may include selecting a color via the color selector. The color selector may include present an electronic display of a plurality of color options. The method may include augmenting a cursor displayed on the screen. When the cursor is augmented, content displayed on the screen may be marked. In some embodiments, augmenting the cursor may include displaying the cursor in a shape that is different than a default shape of the cursor.

Methods may include marking the displayed digital content. The displayed digital content may be marked by highlighting the content in the selected color. Methods may include applying and/or saving the highlight, in the selected color and as applied to the marked content, in the source file that is being accessed to display the content on the screen.

Methods may include copying the marked content. Methods may include pasting the marked content into a target destination. The target destination may be determined based on the highlighting color used to mark the content.

Target destinations may include different sections of an electronic file. The electronic file may be defined by a ZDF extension. At least one of the plurality of target destinations may be a social media platform.

In certain embodiments, the method may include capturing metadata associated with the marked content. Methods may include capturing metadata associated with the marked content. Methods may include tagging the marked content with the metadata. Methods may include storing the captured metadata in the target destination. Methods may include customizing a format of the metadata used to tag the marked content.

Captured metadata may include a page descriptor and a timestamp. Captured metadata may include a page number, line number, date, title, author, timestamp, and/or email sender or any other suitable attribute of the marked content.

Methods may include continuously displaying the widget on the screen of the computing device. Continuously displaying the widget may include keeping the widget visible on the screen despite minimizing or maximizing other applications being executed on the computing device. Continuously displaying the widget may include fading a color or other visual characteristic of the widget when another application is active or maximized on the screen.

The widget may be configured to toggle between an inactive mode and an active mode. Methods may include presenting a mode selector. The mode selector may allow a user to toggle the widget between an inactive mode and an active mode. The mode selector may also allow a user to disable a copy and/or past functionality of the widget.

The widget may be operable across two or more applications running on the computing device. An augmented cursor displayed by the widget may be displayed on the screen of a computer system regardless of which of a plurality of applications are displayed on the screen. Illustrative applications may include a word processor application; a Portable Document Format ("PDF") application; a web browser; an email application; and any other suitable application that displays digital content.

Methods may include presenting a white-out color as a color option. When the white-out color is selected as a highlighting color, marking the content may mask the content. Masking may prevent the content from being displayed on the screen. Masking content may allow inserting new content in place of the masked content. Methods may include unmasking masked content.

A system for collating digital content is provided. The system may include a minimization-resistant widget. The system may include computer executable instructions. The computer executable instructions when executed on a processor of a computer system, may implement functionality of the widget.

The widget may be toggle-able between an active mode and an inactive mode. In the active mode, the system may activate a digital content collating function. In the active mode, the system may maintain visibility of the widget on a screen of the computer system. Visibility of the widget may be maintained even when a user of the computer system switches focus from a first application to a second application. Visibility of the widget may be maintained even when the user minimizes, maximizes or activates other application windows running on the computing device.

Visibility of the widget may be maintained despite any other activity that would typically cause a display of the widget to be minimized or otherwise reduce visibility of the widget on the screen. A minimization-resistant widget may be a widget that remains visible on the screen despite any other activity that would typically cause an operating system to minimize display of the widget or otherwise reduce visibility of the widget on the screen.

In the inactive mode, the system may maintain visibility of the widget on the screen. When in the inactive mode, some or all of the functionality of the widget (e.g., selecting, highlighting, copying, pasting, and/or collating digital content) may be disabled. In some embodiments, when in the inactive mode the widget may not maintain its visibility.

In some embodiments, a tagging function of the widget may detect that digital content displayed on the screen has been selected by a user. In response to detecting the displayed and selected content, the tagging function may highlight the displayed and selected content. The tagging function may copy the displayed and selected content. The tagging function may paste the displayed and selected content into a target file or other target destination.

In response to detecting the displayed and selected content, the tagging function may capture metadata associated with the displayed and selected content. The tagging function may store the captured metadata in a target file or other target destination. The tagging function may index the displayed and selected content. The tagging function may store the displayed and selected content (e.g., within a target file) based on the indexing.

The indexing may include associating a color with the displayed and selected content. The indexing may include collating or ordering the displayed and selected content among other information items stored in the target file. Indexing may include collating or ordering content based on a color associated with marked content.

The minimization-resistant widget may be configured to mark first content displayed on the screen by a first application in a color. The first content may be displayed in a first application window. The minimization-resistant widget may be configured to mark second content displayed on the screen by a second application in the same color used to mark the first content. The second content may be displayed in a second application window. The widget may be configured to mark content displayed by an application in a first color, and second content displayed by the same application in a second color. The first color may be different from the second color.

The widget may also be configured to mark first content displayed by a first application in one color and mark second content displayed by a second application in a second color. The first color may be different from the second color. The system may be configured to index the first and second content based on a color used to mark content.

The first and second marked content may be stored in the target file. The first and second marked content may be collated within the target file based on the color used to mark the content. Storing and collating based on color may include determining a target file, and/or a position within the target file, for storing the marked content, based on the color. The determination may be based at least in part on a predetermined mapping between colors and destinations/positions.

For example, the mapping may associate a first color to a first file, a second color to a second file, and a third color to a different destination, such as a social media page. A fourth color may be mapped to the first file as well. When multiple colors are associated with the same destination, the mapping may include an association between the colors and specific positions (e.g., sections) within a destination, and the widget may paste the content to the specific positions based on the mapping. In some embodiments, the destination itself may internally organize and collate the content based on applied highlighting color. For example, the destination may include an embedded script for collating content stored within the destination. The applied highlighting color may act as a tag, such that the destination file or an application viewing the destination file can separate, organize and display the content based on the applied highlighting colors. The mapping may also be configured to be modified and customized.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is understood that other embodiments may be utilized, and that structural, functional, and procedural modifications may be made without departing from the scope and spirit of the present disclosure.

The steps of methods may be performed in an order other than the order shown and/or described herein. Method embodiments may omit steps shown and/or described in connection with illustrative methods. Method embodiments may include steps that are neither shown nor described in connection with illustrative methods. Illustrative method steps may be combined. For example, an illustrative method may include steps shown in connection with another illustrative method or apparatus.

Apparatus may omit features shown and/or described in connection with illustrative apparatus. Apparatus embodiments may include features that are neither shown nor described in connection with illustrative apparatus. Features of illustrative apparatus may be combined. For example, an illustrative apparatus embodiment may include features shown or described in connection with another illustrative apparatus and/or method embodiment.

FIG. 1 shows an illustrative block diagram of computing system 100. Computing system 100 includes illustrative computer 101. Computer 101 may alternatively be referred to herein as a "server" or a "computing device." Computer 101 may be a desktop, laptop, tablet, smart phone, or any other suitable computing device. Elements of computing system 100, including computer 101, may be used to implement functions of the systems and methods disclosed herein.

Computer 101 includes processor 103 for controlling the operation of the device and its associated components, and may include RAM 105, ROM 107, input/output module 109, and a memory 115. Processor 103 may execute computer executable instructions. Computer executable instructions may be embodied in hardware or firmware (not shown). Processor 103 may execute any suitable software such as operating system 117 and/or applications 119.

Memory 115 may be comprised of any suitable permanent storage technology—e.g., a hard drive. Memory 115 may include EEPROM or Flash memory or any other suitable hardware components. Memory 115 may store software including the operating system 117 and application(s) 119.

Memory 115 may include database 111. Database 111 may store any suitable information including digital content such as videos, text, and/or audio files. The computer 101 may execute the instructions embodied by the software to perform various functions.

Input/output ("I/O") module 109 may provide connectivity to a microphone, keyboard, touch screen, mouse, and/or stylus through which a user of computer 101 may provide input. User input may include input relating to cursor movement, content selection and/or content marking. User input may include a color selection, highlighting content, copy/pasting, and/or organizing digital content. Input/output module 109 may include one or more speakers for providing audio output and a video display device for providing textual, audio, audiovisual, and/or graphical output. Input/output module 109 may provide for any capturing any suitable input for operating system 117 or applications 119. Input/output module 109 may provide for presenting any suitable output generated by operating system 117 or applications 119.

Computing system 100 may operate in a networked environment supporting connections to one or more remote computers, such as terminals 141 and 151. System 100 may be connected to other electronic systems via a local area network (LAN) interface 113. Terminals 141 and 151 may be personal computers or servers that include many or all of the elements described above relative to computing system 100. Network connections depicted in FIG. 1 include a local area network (LAN) 125 and a wide area network (WAN) 129, but may also include other networks. When used in a LAN networking environment, computer 101 may be connected to LAN 125 through a LAN interface or adapter 113. When used in a WAN networking environment, computer 101 may include a modem 127 or other means for establishing communications over WAN 129, such as Internet 131.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit a user to retrieve web pages from a web-based server. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 119, which may be used by computer 101, may include computer executable instructions for invoking user functionality related to communication, such as e-mail, Short Message Service (SMS), and voice input and speech recognition applications. Application program(s) 119 may include computer executable instructions for invoking user functionality related performing various tasks. The various tasks may be related to collating digital content such as highlighting, copy/pasting, and/or indexing digital content. Application program(s) 119 may provide functionality associated with software that presents digital content. Such software may include a word processor application, an application for managing pdf information, a web browser and an email application.

Computer 101 and/or terminals 141 and 151 may also be devices including various other components, such as a battery, speaker, and/or antennas (not shown). For example, computer 101 and/or terminals 141 and 151 may be portable devices such as a laptop, smartphone, tablet, or any other suitable device for receiving, storing, transmitting and/or displaying relevant information.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones, smart phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
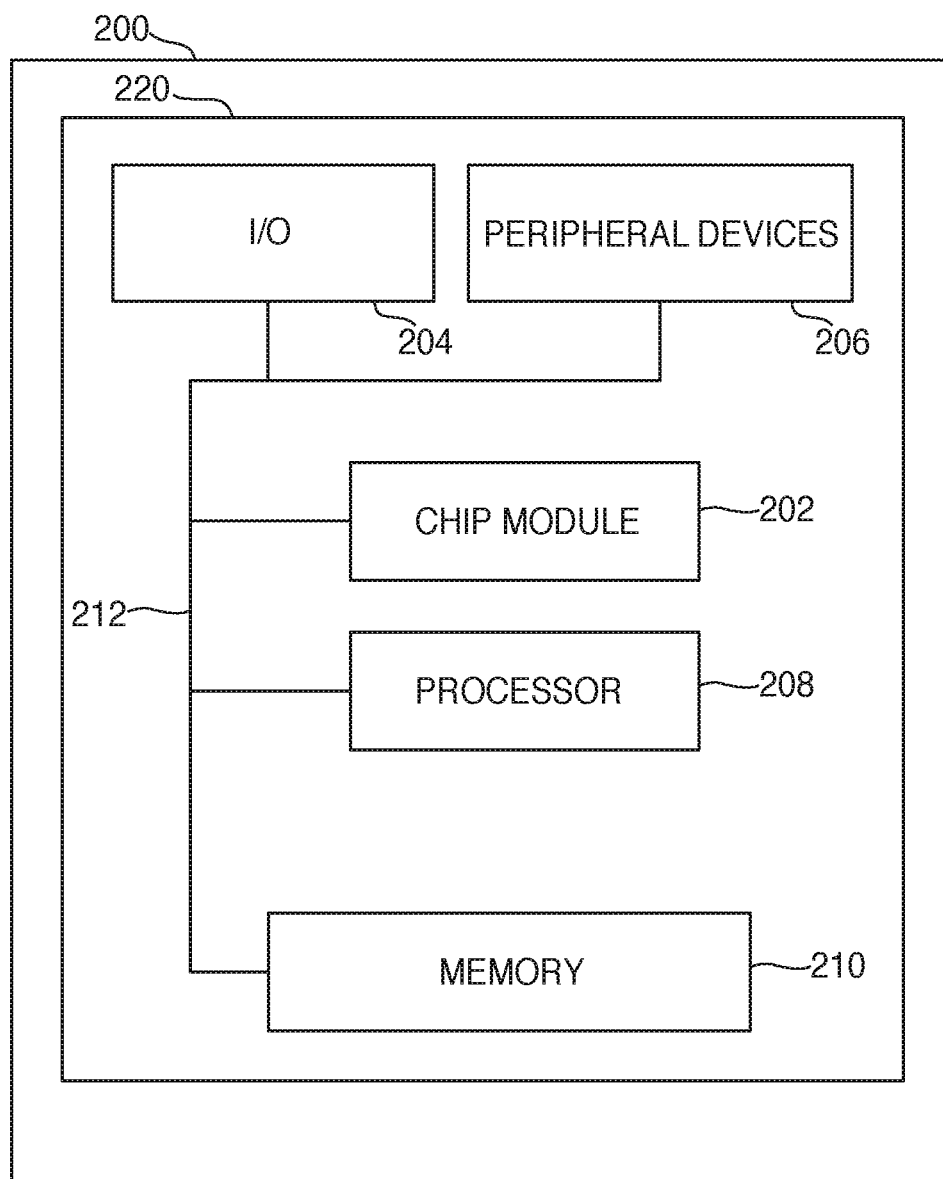
FIG. 2 shows an illustrative apparatus in accordance with principles of the disclosure.

FIG. 2 shows illustrative apparatus 200. Apparatus 200 may represent illustrative components of a computing device. Apparatus 200 may include one or more features of the apparatus shown in FIG. 1. Apparatus 200 includes chip module 202, which may include one or more integrated circuits, and which may include logic configured to perform any other suitable logical operations.

Apparatus 200 includes: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store, in machine-readable data structures: machine executable instructions (which may be alternatively referred to herein as "computer instructions" or "computer code"), applications, signals, and/or any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
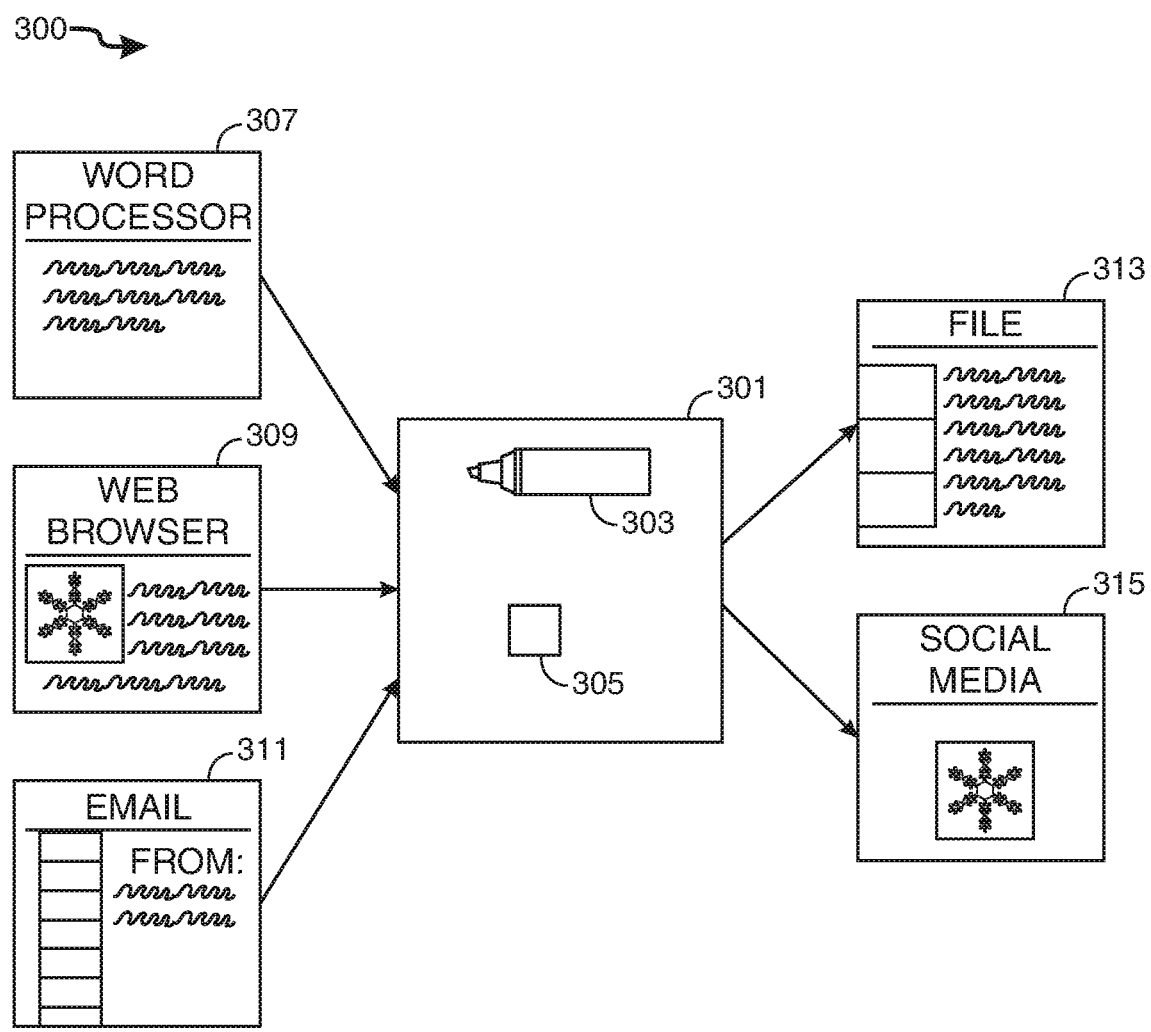
FIG. 3 shows an illustrative system in accordance with principles of the disclosure.

FIG. 3 shows illustrative system 300 in accordance with principles of the disclosure. System 300 may represent an illustrate architecture of a system for collating digital content.

System 300 includes screen 301. Screen 301 may be part of a computing device, such as devices shown in FIGS. 1 and 2. FIG. 3 shows screen 301 displaying widget 303. When widget 303 is active, cursor 305 may be augmented. When widget 303 is active, widget 303 may be configured to collate digital content according to aspects of the disclosure.

Widget 303 may collate digital content presented on screen 301 by one or more of applications 307, 309 and 311. Content presented by each applications 307, 309 and 311 may be presented in separate application windows. Augmented cursor 305 may be configured to select digital content presented by applications 307-311. The selected content may be marked, copied and pasted in one or more of target destinations 313 and 315. Target destination 313 may include one or more electronic files. Target destination 313 may include a file having a "ZDF" extension. Target destination 315 may a social media platform. Digital content pasted to target destination 315 may be broadcast in accordance with setting associated with a social media platform.

Digital content may be pasted to one or more of target destinations 313 and 315 based on a color applied by widget 303 to mark selected digital content. Digital content marked in a first color may be stored in file 313. Digital content marked in a second color may be pushed to social media platform 315. A color used to mark content may determine a location among other content stored within target destination 313 or 315.

Figure 4:
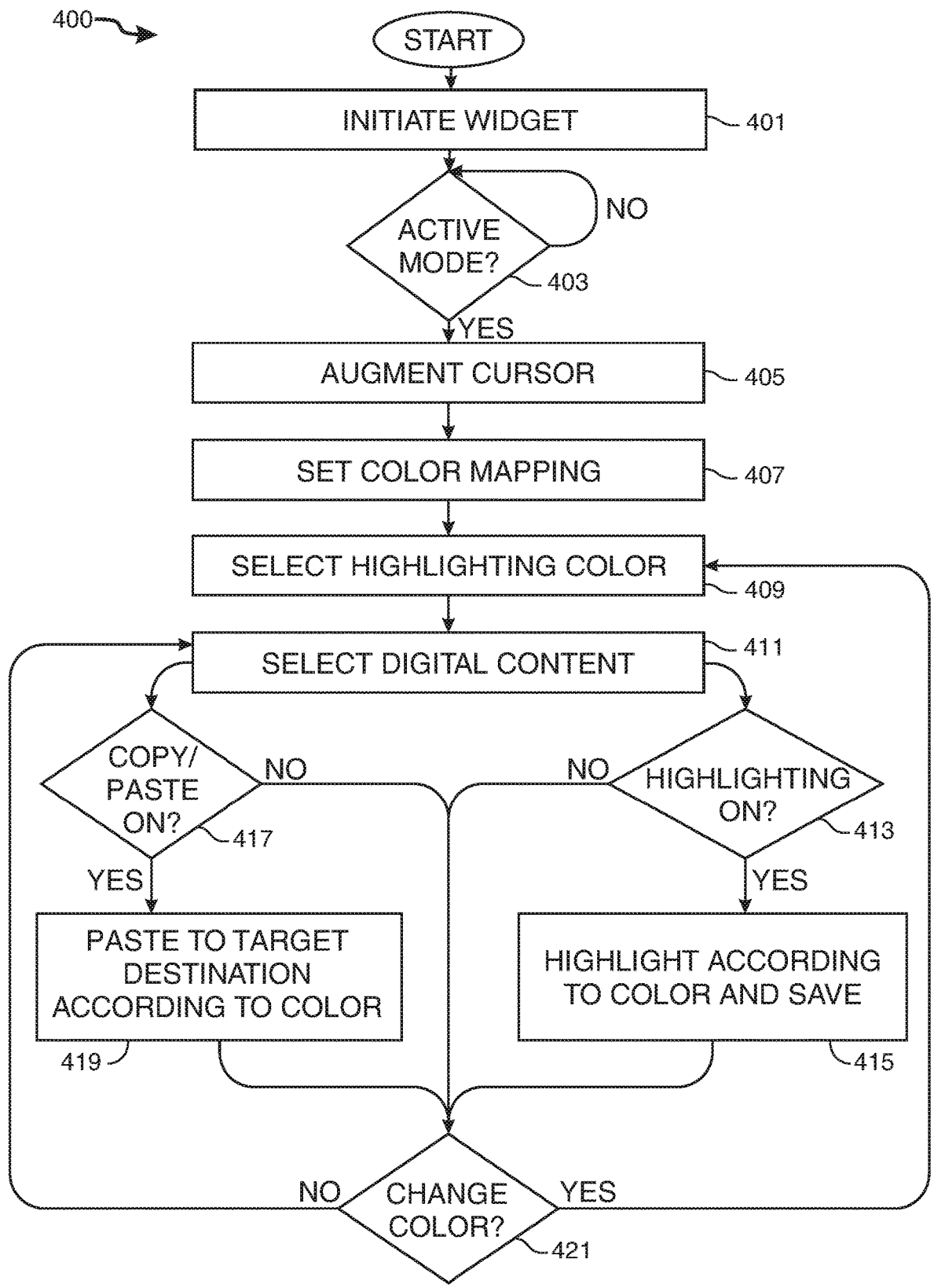
FIG. 4 shows an illustrative process in accordance with principles of the disclosure.

FIG. 4 shows illustrative process 400. One or more of the steps of the process illustrated in FIG. 4 may be performed by any suitable device or system. For example, one or more steps of process 400 may be performed by one or more of devices shown in FIGS. 1-3. For illustrative purposes, process 400 will be described as being performed by a system.

Process 400 may begin at step 401. At step 401, the system initiates operation of a widget, such as widget 303 (shown in FIG. 3). Initiating operation of the widget may include loading computer executable instructions associated with the widget into memory, such as memory 115 (shown in FIG. 1). Initiating operation of the widget may include any other suitable steps for initiating operation of a software computer program.

The initiated widget may be displayed in a predetermined position on a screen of the computing device. After being initiated, the widget may be configured to remain visible on the screen despite a user is actively using other applications available on a computing device. The widget may be configured to appear faded (i.e., partially transparent) when a user is actively using another application.

At step 403, the system determines whether the widget is in an active mode. In some embodiments, the widget may by default initiate in an active mode. The widget may be configurable to disable the active mode. For example, the widget may include a button that, when selected by a user toggles the widget between "active," "inactive." In some embodiments, when initiated, the widget may be in an inactive mode.

If the system determines at step 403 that the widget is in an active mode, at step 405, the system augments a cursor of the computing device. Augmenting the cursor may provide visual feedback to a user that the widget now is ready to select, mark, copy/paste, and/or organize digital content displayed on the screen by any of multiple applications running on the computing device. The augmented cursor may take the form of a shape that is different from a default cursor shape associated with the multiple applications running on the computing device. The augmented cursor may take the form of a shape that is different from a default cursor shape of an application that is currently being actively used by the user. The augmented cursor may dynamically change shaped based on the application currently being actively used by the user.

At step 407, the system may set a color mapping. The color mapping may determine the target destination and/or a position within a target destination for digital content based on a color selected via the widget at the time the digital content is selected.

At step 409, the system may receive user input selecting a highlighting color. The highlighting color may be selected via various options displayed by the widget. The options may include one or more colored buttons. The colors may be predetermined default colors, such as primary, popular, and/or recently selected colors. The widget may be configured to receive a selection of any shade and/or combination of any existing colors.

At step 411, the system receives input selecting digital content. Selecting digital content with the augmented cursor may, depending on widget settings, proceed in accordance one or both of two parallel tracks. Track one includes steps 413 and 415. Track 2 includes steps 417 and 419.

At step 413, the system determines whether a highlighting setting associated with the widget is on. If the highlighting setting is on, step 415 is executed. At step 415, the system highlights the selected content in the color selected at step 409. Highlighting the selected content may include applying and/or saving the marked content within the source file that is being accessed to display the marked digital content.

At step 417, the system determines whether a copy/paste setting associated with the widget is on. If the copy/paste setting is on, step 419 is executed. At step 419, the system copies the selected content and pastes it to a target destination. The target location may be different from the source location. The target location may be determined based on a color used to highlight the selected digital content. Pasting to the target destination may include determining a target destination and/or collating the pasted content within the target destination. The content may be collated within the target location based on the highlighted color used to mark the digital content selected in step 411.

At step 421, when the applicable steps of track one and/or two are completed, the system may determine whether the color selection has changed. If the color has been changed, process 400 may loop back to step 409 in preparation for additional digital content selection. If the color has not been changed, process 400 may loop back to step 411 in preparation for selection of additional digital content.

Figure 5:
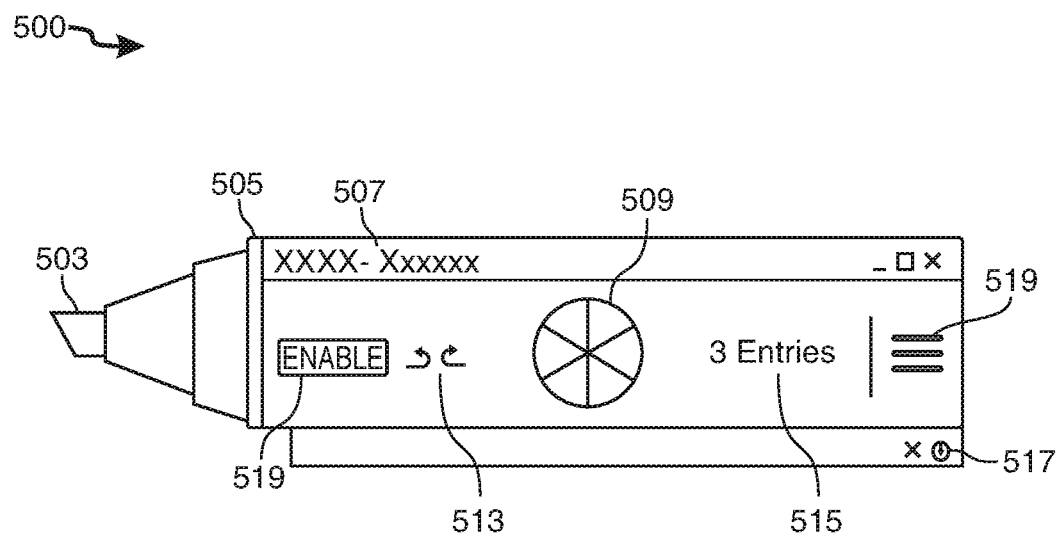
FIG. 5 shows an illustrative software widget in accordance with principles of the disclosure.

FIG. 5 shows illustrative software widget 500. Software widget 500 includes color indicator 503. Color indicator 503 may resemble a writing tip of a mechanical highlighter. Color stripe 505 may be a stripe of color that matches the color of color indicator 503. Software widget 500 may include any suitable number of colored components that may be configured to convey a current color selection. The color displayed by color indicator 503 may conform to the color currently selected via color selector 509. Color selector 509 may present any suitable selectable options for selecting a color. Selectable options may include display of buttons and/or boxes. Selectable options may include display of colors in a pie-like format. The pie-like format may include a different color within each "slice" of the pie. Color selector 509 may present a palette in which multiple colors and/or shades may overlap, providing a user a spectrum of colors for selection.

Data field 507 may display a name of the target destination. The target destination may be a file name. The file may be a file having a "ZDF" extension.

Button 519 provides a mechanism for enabling, or activating, widget 500, or certain features thereof. Button 519 may provide a mechanism for disabling, or deactivating, widget 500, or certain features thereof.

Icons 513 provide a mechanism for "Undo" and "Redo" of recent activity performed by widget 500. Information 515 may include a number of instance of selected digital content may have been stored in target destination 507.

Button 517 provides a mechanism for expanding a display of widget 500. An expanded view of widget 500 may display data stored in a ZDF file. Menu 519, when selected, displays additional system settings such as where to stored ZDF files, names of ZDF files, whether to launch the widget in the active or inactive state, a default highlight color selection. System settings may configure the widget to be in the active state for the content of specified applications and configure the widget to be in the inactive state for the content of other specified applications.

Figure 6:
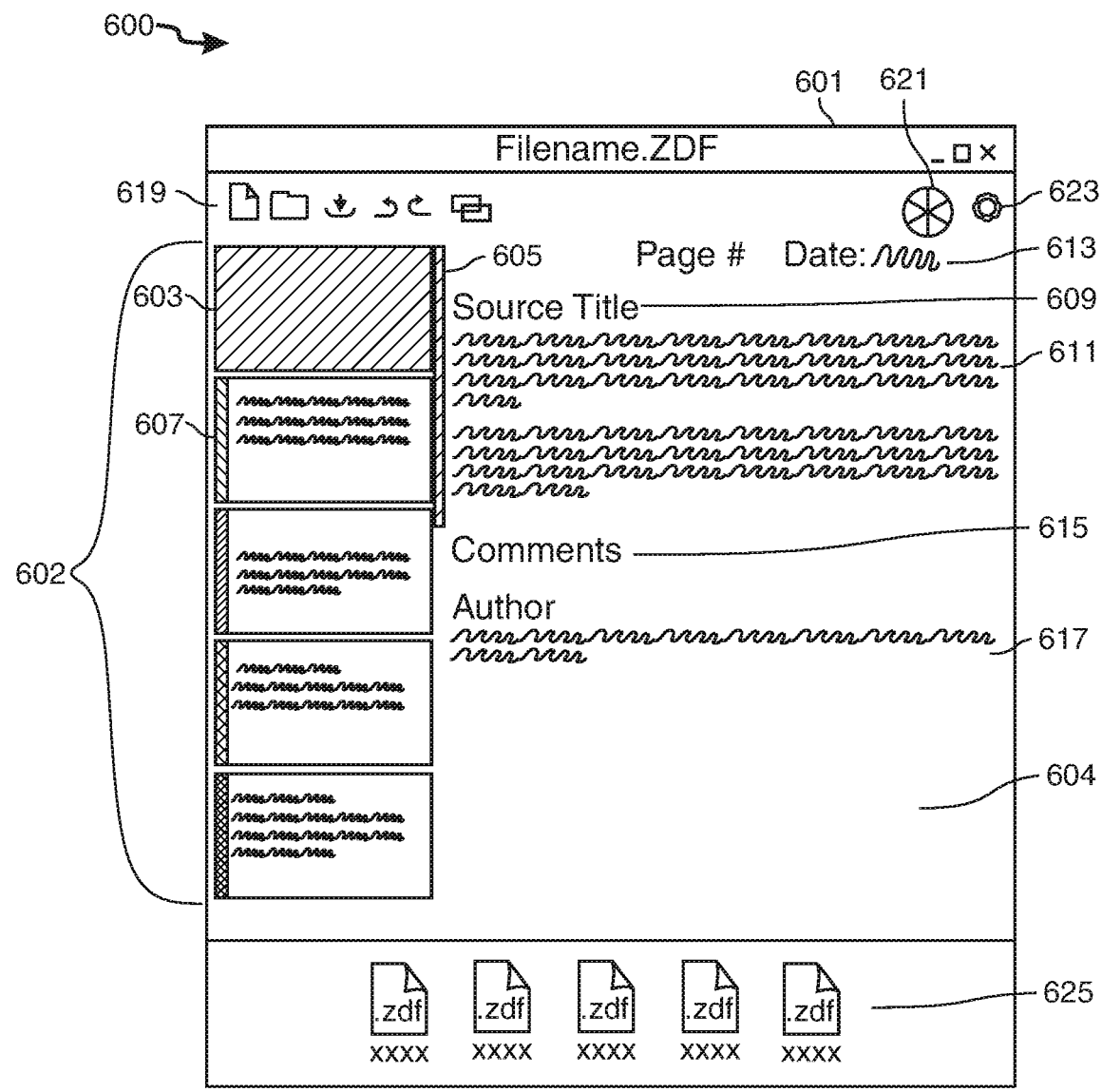
FIG. 6 shows an illustrative screenshot of software operating in accordance with principles of the disclosure.

FIG. 6 shows illustrative screenshot 600. Screenshot 600 is associated with exemplary target file 601. Target file 601 may be a file with a ".zdf" extension.

Target file 601 may store and present collated digital content. Collated digital content may have been selected, marked and copied using a software widget (such as widget 500, shown in FIG. 5). Collated content may have been captured from one or more applications (such as applications 307, 309 or 311, shown in FIG. 3) running on a computing device (such as computing device 101, shown in FIG. 1). The software widget may automatically collate digital content in target file 601 according to a highlighting color applied by the software widget to the digital content.

For example, target file 601 may include navigation pane 602. Navigation pane 602 may display a list of digital content entries stored in target file 601 and a color associated with each entry. For example, navigation pane 602 shows that entry 603 is currently displayed within viewing pane 604. Hatching associated with entry 603 indicates that entry 603 has been marked with a first color.

Entry 607 includes hatching that is different from the hatching associated with entry 603. The different hatching indicates that entry 603 has been marked with a second color. Entry 607 shows that a snippet of the digital content associated with entry 607 may be displayed in navigation pane 602. Each entry shown in navigation pane 602 may be associated with a hatching corresponding to a color used to mark the digital content associated with the entry.

Viewing pane 604 shows illustrative information associated with entry 603. The illustrative information includes title 609. Title 609 may be the title of the source document that includes the content associated with entry 603. Substance 611 may show the digital content associated with entry 603. The digital content may include text, image, multimedia, or any other suitable digital content. Metadata 613 show page and date information for entry 603. Metadata 613 may include an author, page number, date, sender, and any other suitable metadata.

Target file 601 includes comments 615. Comments 615 may be configured to enable a user to enter and store comments associated with entry 603. The author of comment 615 may be a user different from the user that selected substance 611. Comment 617, may include text, identification of the comment author and metadata (date/time/location/device used) associated with the comment.

Icons 619 may provide access to features associated with target file 601. The features may include "create new file," "open file," "save file," "undo action," "redo action," "capture a screenshot," and any other suitable function. Icon 621 may provide access to a color selector or indicator. Icon 621 may be configured to search, filter, or display entries in target file 601 according to a selected color. Icon 621 may, in certain embodiments, be a single-color element that displays the color of a selected entry. Icon 623 may provide access to a settings menu. Settings menu that allow changes to access rights or such as read/write permissions associated with target file 601. Display pane 625 may show a list of recently-accessed target files.

Figure 7:
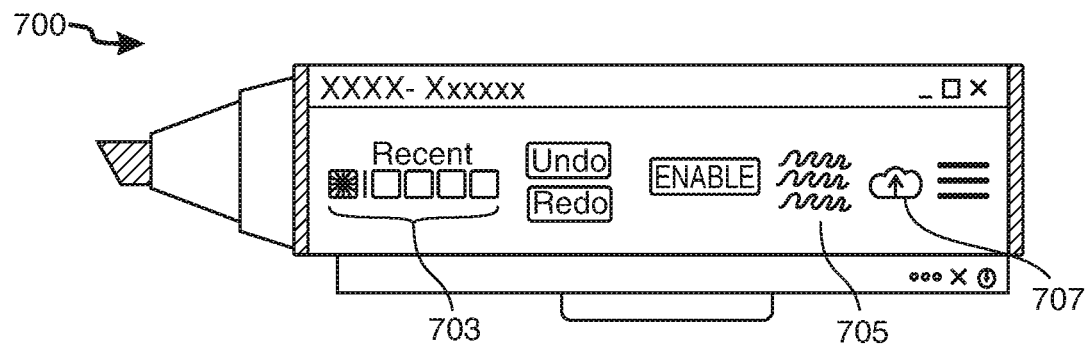
FIG. 7 shows another illustrative software widget in accordance with principles of the disclosure.

FIG. 7 shows illustrative software widget 700. Software widget 700 may include one or more features of any other software widget described herein. Software widget 700 includes color indicators 703. Color indicators 703 show a currently selected color. Color indicators 703 show selectable color options and/or recently selected colors (available for selection). In some embodiments, color indicators 703 may include a color spectrum or palette for selecting a custom color.

Information 705 may show attributes of a target destination. Such attributes may include a number of entries stored in the target destination, notes, comments, etc., or any other suitable information. Icon 707 may provide access to functionality for transferring or uploading digital content to a remote target destination. The remote target destination may be cloud-based storage location or any other target location accessible over a network.

Figure 8:
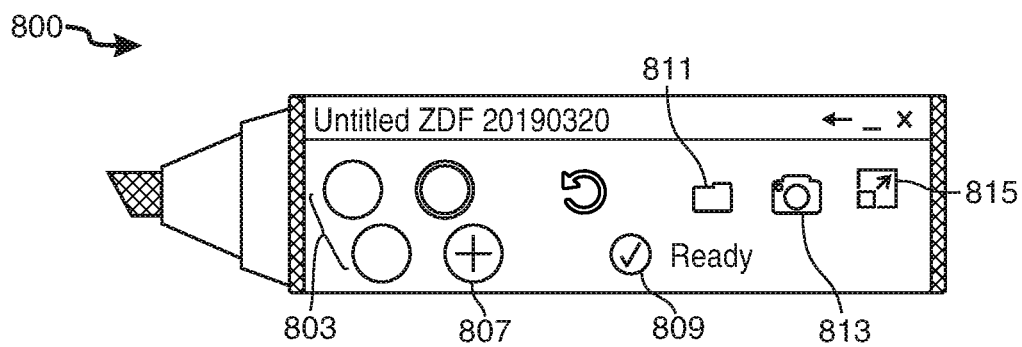
FIG. 8 shows another illustrative software widget in accordance with principles of the disclosure.

FIG. 8 shows illustrative software widget 800. Software widget 800 may include one or more features of any other software widget described herein. Software widget 800 includes color indicators 803. Color indicators 803 show a currently selected color. Color indicators 803 may show other colors available for selection and/or recently selected colors. Color indicators 803 may also include element 807 for accessing additional colors. The additional colors may be customizable.

Icon 809 is a selectable status indicator/selector. Icon 809 currently shows that software widget 901 is ready to mark digital content. Clicking on icon 809 may toggle software widget between active and inactive states. Icons 811-815 provide access to opening a new target file (811), capturing a screenshot of information currently displayed on a screen (813), and expanding the widget (815). Clicking on icon 815 may trigger display of information shown in screenshot 600 (shown in FIG. 6).

Figure 9:
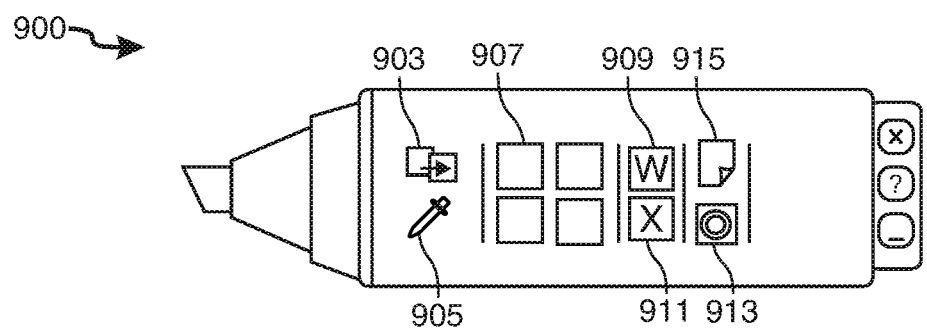
FIG. 9 shows another illustrative software widget in accordance with principles of the disclosure.

FIG. 9 shows illustrative software widget 900. Software widget 900 may include one or more features of any other software widget described herein.

Software widget 900 includes icon 903. Clicking or otherwise selecting icon 903 may turn on/off a highlighting feature of software widget 900. Clicking or otherwise selecting icon 905 may expand/collapse a color selection panel. Color indicators 907 may display a default selection of color options and/or recently selected colors.

Icons 909-915 activate functionality for collating digital content captured from specific applications and/or specific digital content types. For example, selecting icon 909 may activate functionality for collating content associated with a word processing application. For example, by selecting icon 909, a user may configure software widget 900 to copy content displayed in a word processor application into a target destination, with or without, formatting applied by the word processor. Selecting icon 911 may trigger copying of content from a spreadsheet application. By selecting icon 911, a user may configure software widget 900 to copy content displayed in a spreadsheet application into a target destination along with specific metadata associated with the source spreadsheet (e.g., cell location, column/row identifiers).

Selecting icon 915 may trigger copying of selected digital content, and selecting icon 913 may trigger functionality for copying of an image. In some embodiments, software widget 900 may be configured to automatically recognize the application and/or type of the digital content being selected, and to execute a specific routine or functionality for marking and/or copying displayed digital content.

FIGS. 10A-10E show illustrative computer code for implementing functionality of a system for collating digital content. The code shown in FIGS. 10A-10E may be stored in memory 115 (e.g., as applications 119) and may be executed by processor 103 (all shown above in FIG. 1). The code may enable the widget to operate as if user focus has not shifted away from the widget, despite user actions (e.g., a mouse click in another application window) that would typically shift user focus away from the widget. The widget may continue to select and highlight text displayed in another application window, or provide any other widget functionality described herein to text displayed in another application window, despite user focus shifting to the other application window.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, systems and methods for collation of digital content are provided. Persons skilled in the art will appreciate that the present invention can be practiced by other than the described embodiments, which are presented for purposes of illustration rather than of limitation, and that the present invention is limited only by the claims that follow.

What is claimed is:

1. A computer system for collating digital content, the computer system comprising:
   a processor that controls operation of the computer system;
   a screen; and
   a non-transitory memory storing computer executable instructions that, when run on the processor, implement operational features of a minimization-resistant widget for collating digital content, the widget capable of being associated with an active focus and implementing the operational features even when the active focus is not associated with the widget, wherein the operational features:
   toggle the widget between an active mode and an inactive mode;
   in the active mode:
      activate a digital content collating function;
      maintain visibility of the widget in a foreground of a display presented on the screen of the computer system when a user of the computer system switches the active focus from the widget or a first application window to a second application window or from the widget or the second application window to the first application window; and control presentation of text displayed on the screen:
in the second application window after the user switches the active focus from the first application window to the second application window; and
in the first application window after the user switches the active focus from the second application window to the first application window; and
in the inactive mode, maintain visibility of the widget in the foreground of the display when the user switches the active focus to the second application window or to the first application window.

2. The computer system of claim 1, wherein the operational features of the minimization-resistant widget comprise a tagging function that:
detects content presented on the screen and selected by the user; and
in response to detecting the selected content:
marks the selected content;
copies the selected content; and
pastes the selected content into a target file.

3. The computer system of claim 2, wherein the tagging function:
indexes the selected content; and
stores the selected content within the target file based on the indexing.

4. The computer system of claim 3, wherein the tagging function indexes the selected content by:
associating a color with the selected content; and
collating the selected content among other information stored in the target file based on the color.

5. The computer system of claim 3, wherein the operational features of the minimization-resistant widget:
mark first content displayed on the screen in the first application window in a highlighting color;
mark second content displayed on the screen in the second application window in the highlighting color; and
index the first and second content based on the highlighting color.

6. The computer system of claim 5, wherein the operational features of the minimization-resistant widget:
store the first and second content in the target file; and
collate the first and second content within the target file based on the highlighting color.

7. A computer system for collating digital content, the computer system comprising:
a processor that controls operation of the computer system;
a screen; and
a non-transitory memory storing computer executable instructions, that when run on the processor to implement a widget capable of being associated with an active focus and providing highlighting functionality comprising:
continuously displaying the widget on the screen of the computer system, said widget comprising a color selector; and
selecting content displayed on the screen, wherein selecting the content triggers the widget to:
highlight the content displayed on the screen using a color activated by the color selector;
copy highlighted content; and
paste the highlighted content into a target destination;
wherein:
the widget is run on the computer system concurrently with a first application and a second application;
the continuously displaying of the widget keeps the widget active and visible on the screen despite shifting the active focus away from the widget or the first application to the second application or shifting the active focus away from the widget or the second application to the first application;
in response to shifting the active focus to the first application, while the active focus is associated with the first application the widget implements the highlighting functionality as if the active focus is associated with the widget and the widget controls application of a first color to highlight the content displayed on the screen when the content is generated by the first application and the first application is associated with the active focus;
in response to shifting the active focus to the second application, while the active focus is associated with the second application the widget implements the highlighting functionality as if the active focus is associated with the widget and the widget controls application of a second color to highlight the content displayed on the screen when the content is generated by the second application and the second application is associated with the active focus;
a first file is the target destination for the content displayed on the screen and highlighted in the first color; and
a second file is the target destination for the content displayed on the screen and highlighted in the second color.

8. The system of claim 7, the highlighting functionality further comprising:
capturing metadata associated with the highlighted content, said metadata comprising a page descriptor, timestamp, page number, line number, date, title, author, timestamp, and/or email sender of the highlighted content; and
tagging the highlighted content with the metadata when pasting the highlighted content into the target destination.

9. The system of claim 7, wherein when the first application or the second application is associated with the active focus the continuously displaying comprises:
keeping the widget displayed on the screen; and
fading a color of the widget.

10. The system of claim 7, the highlighting functionality further comprising saving the color applied to highlight the content in a source file being accessed to display the content on the screen.

11. The system of claim 7, wherein the first and the second applications comprise at least two of:
a word processor application;
a Portable Document Format ("PDF") application;
a web browser; and
an email application.

12. The system of claim 7, wherein the target destination is one of a plurality of target destinations, and the highlighting functionality further comprising selecting one of the plurality of target destinations for the highlighted content based on the color used to highlight the content.

13. The system of claim 12, wherein at least two of the plurality of target destinations are different sections of a single file.

14. The system of claim 7, further comprising an input tool coupled to the computer system, said input tool comprising:
- a sensor for sensing movement input that controls a movement of the cursor; and
- a plurality of buttons, wherein each of the plurality of buttons, when pressed, activates a different color via the color selector.

15. The system of claim 7, wherein the color activated by the color selector is a white-out color, and highlighting the content comprises masking the content, wherein said masking:
- hides the content from being displayed on the screen; and
- enables unmasking to display the content on the screen.

16. A method for organized, color-coded collating of digital content, the method executed by computer executable instructions running on a processor, the method comprising:
- displaying a widget on a screen of a computing device, said widget capable of being associated with an active focus and comprising a color selector;
- using the color selector, activating a highlighting color from a plurality of color options;
- augmenting a cursor displayed on the screen to visibly show that a content selection functionality of the widget is active; and
- in response to shifting the active focus to a first application or to a second application, providing highlighting functionality via the widget as if the active focus is associated with the widget, the highlighting functionality comprising:
  - after shifting the active focus to the first application and while the active focus is associated with the first application:
    - selecting first content displayed on the screen by the first application running on the computing device;
    - highlighting the selected first content using the highlighting color;
    - copying the highlighted first content;
    - determining a target destination for the highlighted first content based on the highlighting color; and
    - pasting the highlighted first content into the target destination;
  - keeping the widget visible in a foreground of the screen after shifting the active focus away from the first application to the second application running on the computing device; and
  - after shifting the active focus away from the first application to the second application, and while the active focus is associated with the second application, using the widget to control display of second content presented on the screen by the second application as if the active focus is associated with the widget.

17. The method of claim 16, wherein the target destination is a social media platform.

18. The method of claim 16, the highlighting functionality further comprising, after shifting the active focus to the second application:
- preventing the widget from being pushed to a background of the screen; and
- fading a visual characteristic of the widget.

19. The method of claim 16, the highlighting functionality further comprising:
- highlighting the first content and the second content using an identical highlighting color; and
- collating the first content and the second content within a target file based on the identical highlighting color.

* * * * *